US012725851B2

(12) United States Patent
Boyd et al.

(10) Patent No.: US 12,725,851 B2
(45) Date of Patent: Sep. 1, 2026

(54) FLUID DISTRIBUTION TANK FOR A TUBULAR ELEMENT

(71) Applicant: VALEO SYSTEMES THERMIQUES, La Verriere (FR)

(72) Inventors: Donald Boyd, Troy, MI (US); Dominik Sporna, Troy, MI (US); Matt Szymczak, Troy, MI (US); William Dodson, Troy, MI (US); Matthew Bloss, Troy, MI (US); Przemyslaw Trela, Troy, MI (US)

(73) Assignee: Valeo Electrification, Cergy Pontoise (FR)

(*) Notice: Subject to any disclaimer, the term of this patent is extended or adjusted under 35 U.S.C. 154(b) by 724 days.

(21) Appl. No.: 18/059,162

(22) Filed: Nov. 28, 2022

(65) Prior Publication Data

US 2024/0178477 A1 May 30, 2024

(51) Int. Cl.
*H01M 10/6556* (2014.01)
*H01M 10/613* (2014.01)
*H01M 10/625* (2014.01)
*H01M 10/6554* (2014.01)

(52) U.S. Cl.
CPC ..... *H01M 10/6556* (2015.04); *H01M 10/613* (2015.04); *H01M 10/625* (2015.04); *H01M 10/6554* (2015.04); *H01M 2220/20* (2013.01)

(58) Field of Classification Search
CPC ...... F28F 3/12; H01M 10/613; H01M 10/625; H01M 10/6552; H01M 10/6554; H01M 10/6556
See application file for complete search history.

(56) References Cited

U.S. PATENT DOCUMENTS 10,020,550 B2 7/2018 Sumpf, Jr. et al.
2005/0170241 A1* 8/2005 German .............. H01M 10/663 429/120
2008/0223563 A1* 9/2008 Penny .................. F28D 7/0041 29/890.035
2011/0132580 A1* 6/2011 Herrmann ........... H01M 8/2483 165/104.33

(Continued)

FOREIGN PATENT DOCUMENTS

EP 4036507 A1 8/2022
FR 2864215 A1 6/2005
WO WO-2005061980 A2 * 7/2005 ............ F28F 9/0221

OTHER PUBLICATIONS

European Patent Office, International Search Report and Written Opinion of corresponding International Application No. PCT/EP2023/082973, dated Feb. 22, 2024.

*Primary Examiner* — Nelson J Nieves
(74) *Attorney, Agent, or Firm* — Valeo Electrification

(57) ABSTRACT

A fluid distribution tank of a heat exchanger includes a pair of plates, including a first plate and a second plate, coupled with each other to define a distribution chamber with a connecting opening between the first plate and the second plate, the connecting opening being adapted to form connection between the fluid distribution tank and a tubular element of the heat exchanger, and at least one dividing wall located between the first plate and the second plate to divide the distribution chamber into at least two sub-chambers. Volumes of the individual sub-chambers are different from each other.

20 Claims, 11 Drawing Sheets

(56) References Cited

U.S. PATENT DOCUMENTS

| | | | | |
|---|---|---|---|---|
| 2012/0145373 | A1* | 6/2012 | Chadwick | F24H 9/0015 165/181 |
| 2013/0189557 | A1* | 7/2013 | Haussmann | H01M 10/6569 165/104.11 |
| 2015/0034287 | A1* | 2/2015 | Otto | H01M 10/647 165/168 |
| 2017/0196127 | A1 | 7/2017 | Seidl et al. | |
| 2021/0280927 | A1* | 9/2021 | Aiello | H01M 50/209 |

* cited by examiner

FLUID DISTRIBUTION TANK FOR A TUBULAR ELEMENT

TECHNICAL FIELD

The present invention relates to heat exchangers used for cooling batteries in electric and/or hybrid vehicles. More particularly, it pertains to an improved fluid distribution tank for a tubular element of a heat exchanger for cooling battery cells.

BACKGROUND OF THE INVENTION

Thermal management system is vital for efficient operation of a battery pack in vehicles such as electric vehicles and hybrid-electric vehicles. The battery pack is an energy source of such a vehicle and provide required power to traction motors and other electric and/or electronic components. The battery pack includes a plurality of rechargeable battery cells and has a narrow operating temperature range, therefore the battery pack must be maintained within that specified operating temperature range to operate efficiently. During hot conditions and/or vehicle operating conditions, the battery pack needs to be cooled to maintain the temperature within the specified operating temperature range, whereas in cold conditions, the battery pack needs to be warmed to reach the optimum temperature. Deviation of battery pack's temperature from the specified temperature range can impede battery pack performance and reduce battery efficiency and durability. Sometimes, the batteries can be permanently damaged or destroyed due to deviation of the battery pack temperature outside the specified temperature range, and overheating of the battery cells can even result in fires and other safety related issues.

Typical thermal management system to cool and heat the battery pack relies on a number of subsystems such as a chiller, air-to-fluid heat exchanger, electric heater etc. The chiller or air-to-fluid heat exchanger are adapted for cooling the heat exchange fluid such as refrigerant or coolant in a battery loop to cool the battery pack, while the electric heater is adapted for heating the heat exchange fluid in the battery loop to increase the temperature of the battery pack.

Generally, conventional heat exchangers include multiple thermal cooling tube arrangements for cooling battery cells of the battery pack. Such a thermal cooling tube arrangement include a thermal cooling tube having two sets of channels/micro-channels, including inlet channels and outlet channels, through which fluid/coolant circulates and a center channel which is configured between the two sets of channel and blocked at both opposite ends, an entry/exit tank at one end of the cooling tube, and a flow reversal tank/return tank at other end of cooling tube to allow the fluid to pass through the channels and follow the U-flow path. The thermal cooling tube arrangement is adapted for cooling of the battery cells that are indirectly in contact with the fluid/coolant circulating through the two sets of channels/micro-channels and following along a U-flow path. However, the existing end tank, particularly the entry/exit tank, of the heat exchangers include complex component designs and complex joints, which increase the assembly time as well as manufacturing cost of the existing cooling tube arrangements or the heat exchanger.

Therefore, there is a need for a simple and robust end tank arrangement for thermal cooling tube, which can overcome the abovementioned problems associated with the existing end tanks of the exiting heat exchanger or the thermal cooling tube arrangement. Further, there is a need for a simple and cost-effective tank and tube assembly for U-flow cooling of battery cells of a battery pack.

BRIEF SUMMARY OF THE INVENTION

The present invention discloses a fluid distribution end tank for thermal cooling tubes of heat exchangers, which includes simple component design therefore lowering components manufacturing cost and simplifying assembly process, thereby obviating drawbacks of the conventional end tanks of the existing cooling tube arrangements. In addition, the proposed end tank, particularly, the fluid distribution tank, provides multiple compartments with inlet and outlet openings to enable the fluid to follow one or more U-flow passes through a single cooling tube.

The disclosed end tank includes simple joints thereby providing good joining/sealing repeatability as well as improving performance, reliability and service life of the end tank, consequently improving performance, reliability and service life of the thermal cooling tube assembly or the heat exchanger. In addition, the disclosed end tank provides larger brazing surface for mating components to be fixed/bonded.

In accordance with an embodiment of the present invention, the disclosed fluid distribution tank includes a pair of plates, including a first plate and a second plate, coupled with each other to define a distribution chamber with a connecting opening between the first plate and the second plate. The connecting opening is adapted to form connection between the fluid distribution tank and a tubular element of the heat exchanger. The fluid distribution tank further includes at least one dividing wall located between the first plate and the second plate to divide the distribution chamber into at least two sub-chambers, wherein volumes of the individual sub-chambers are different from each other.

The at least one dividing wall is projected from at least one of the first plate and the second plate. In addition, the at least one dividing wall is coupled to the first plate and the second plate. For instance, at least one of the first plate and the second plate can be a stamped metal plate. For instance, the at least one dividing wall can be a stamped rib extending from the first plate. In addition, the first plate, second plate and the at least one dividing wall can be coupled with each other through a joining process such as but not limited to brazing.

At least one of the first plate and the second plate includes at least one inlet opening for ingress of the fluid with respect to the distribution chamber. At least one of the first plate and the second plate includes at least one outlet opening for egress of the fluid with respect to the distribution chamber. The at least one inlet opening and the at least one outlet opening are configured such that at least one of the at least two sub-chambers is fluidically connected to the at least one inlet opening, and at least one of the at least two sub-chambers is fluidically connected to the at least one outlet opening.

Besides, the first plate and the second plate have side edges projecting towards each other. The side edges of the first plate adjoin with the side edges of the second plate. In addition, the adjoining side edges of the first plate and the second plate can be crimped with each other.

In an embodiment, the at least two sub-chambers extend from the connecting opening. The cross-sections of the at least two sub-chambers can have rectangular shape. In addition, the at least one dividing wall can be straight.

In another embodiment, the at least two sub-chambers extend from the connecting opening so as to form arched pathways for the fluid from the at least one inlet and to the at least one outlet. In addition, the at least one dividing wall can be substantially U-shaped.

In accordance with another embodiment, the present invention discloses a tank and tube assembly for a heat exchanger. The tank and tube assembly includes a tubular element including at least one set of inlet channels and at least one set of outlet channels configured in fluid communication with the at least one set of inlet channels to create at least one U-flow pass for a fluid through the tubular element, and a fluid distribution tank, such as a tank disclosed above, coupled to a first end of the tubular element. The fluid distribution tank includes a first plate and a second plate coupled with each other to define a distribution chamber with a connecting opening to form connection between the fluid distribution tank and the tubular element, and at least one dividing wall to divide the distribution chamber into the at least two sub-chambers, wherein volumes of the individual sub-chambers are different from each other.

In the present description, some elements or parameters can be indexed, such as a first element and a second element. In this case, unless stated otherwise, this indexation is only meant to differentiate and name elements which are similar but not identical. No idea of priority should be inferred from such indexation, as these terms can be switched without betraying the invention. Additionally, this indexation does not imply any order in mounting or use of the elements of the invention.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

DETAILED DESCRIPTION OF THE INVENTION

Figure 1:
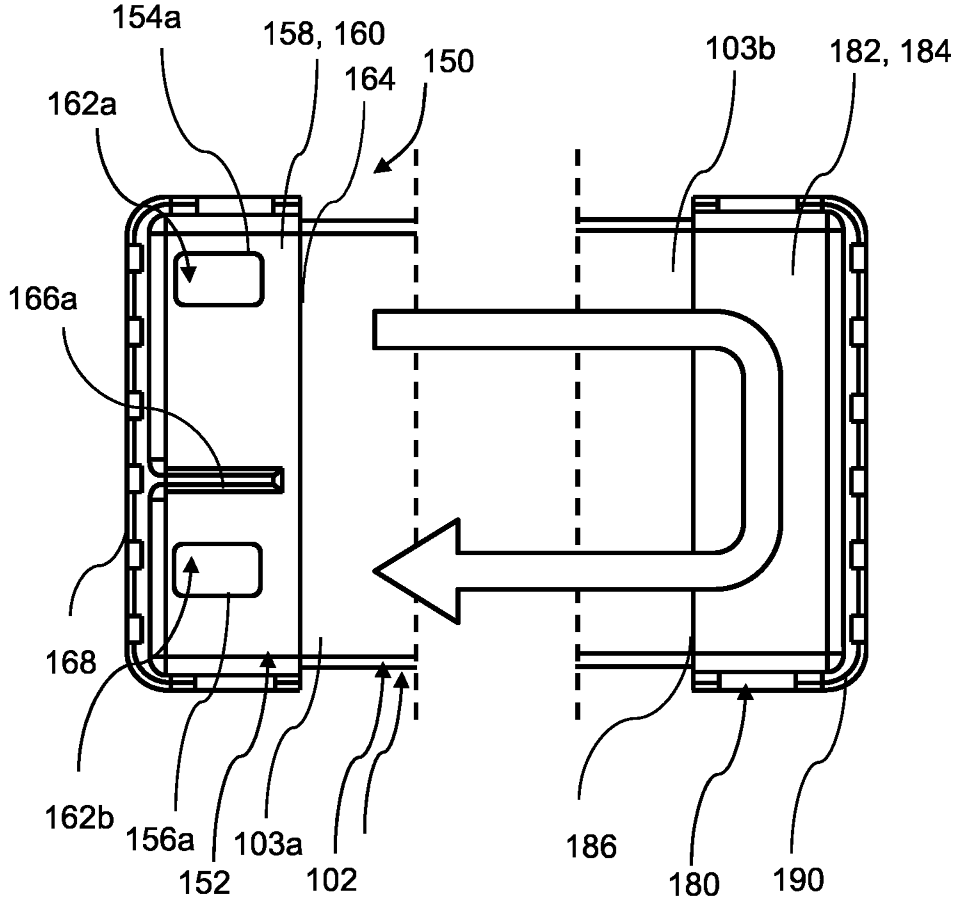
FIG. 1 illustrates a tank and tube assembly with one U-flow pass for a heat exchanger in accordance with an embodiment of the present invention.

It must be noted that the figures disclose the invention in a detailed enough way to be implemented, said figures helping to better define the invention if needs be. The invention should however not be limited to the embodiment disclosed in the description.

The present invention is explained in the forthcoming description and the accompanying drawings with examples of tank and tube assemblies for heat exchangers, wherein each of the tank and tube assembly is formed by assembling a tubular element and one or more end tanks fitted to opposite ends of the tubular element to create one or more U-flow passes for a heat exchange fluid for cooling battery cells of an electric and/or hybrid vehicle. The end tank, such as a fluid distribution tank, of the tank and tube assembly includes simple component design, therefore lowering components manufacturing cost and simplifying assembly process. Furthermore, the disclosed tank and tube assembly facilitates low restrictive flow features and does not contribute significantly to pressure drop. Moreover, the disclosed tank and tube assembly can be easily retrofitted with battery cells in the battery pack, which leads to optimal space usage, i.e. efficient cooling tank and tube assembly density between the battery cells, with space clearance above and below the battery modules.

It is to be appreciated that the concept of the present invention is applicable for any other application in vehicular and non-vehicular environment, where it is required to use the cooling tube arrangement for cooling battery cells, and all such applications are within scope of the present invention without any limitations whatsoever.

Referring to FIGS. 1, 3, 5, 7, 9 and 10, the present invention discloses a tank and tube assembly 150 for a heat exchanger for cooling battery cells of a battery pack. For instance, the battery pack can be installed on an electric or hybrid vehicle, wherein the battery cells of the battery pack can be rechargeable cylindrical cells. The tank and tube assembly 150 includes a tubular element 102, a fluid distribution tank 152 coupled to a first end 103*a* of the tubular element 102 and a return tank 180 coupled to a second end 103*b* of the tubular element 102. The first end 103*a* and the second end 103*b* are transverse open ends of the tubular element 102, wherein the second end 103*b* is opposite to the first end 103*a*. The first end 103*a* of the tubular element 102 can be an inlet/exit end of the tubular element 102 through which a fluid inters and exits the tubular element 102. The second end 103*b* can be return end of the tubular element 102 where the return tank 180 return/deviates the fluid exiting tubular element 102 to follow the U-flow path through the tubular element 102. The tubular element 102 includes at least one set of inlet channels 104*a*, 104*b* and at least one set of outlet channels 106*a*, 106*b* configured in fluid communication with the inlet channels 104*a*, 104*b* to create at least one U-flow pass for the fluid through the tubular element 102. For instance, all components of the tank and tube assembly 150 can be coupled with each other through a suitable joining process such as but not limited to a brazing process.

The fluid distribution tank 152 includes a first plate 158 and a second plate 160 coupled to the first plate 158 to define a distribution chamber with a connecting opening 164 between the first plate 158 and the second plate 160. For instance, the first plate and the second plate can be coupled though the brazing process. The connecting opening 164 is adapted to form connection between the fluid distribution tank 152 and the tubular element 102. The connecting opening 164 of the fluid distribution tank 152 is adapted to receive and securely hold the first end 103*a* of the tubular element 102. In addition, at least one of the first plate 158 and the second plate 160 is provided with at least one inlet opening 154*a*, 154*b* for ingress of the fluid with respect to the distribution chamber, and at least one of the first plate 158 and the second plate 160 is provided with at least one outlet opening 156*a*, 156*b* for egress of the fluid with respect to the distribution chamber. Besides, at least one wall 166*a*, 166*b*, can be provided between the first plate 158 and the second plate 160 to divide the distribution chamber into at least two sub-chambers, such as sub-chambers 162*a*, 162*b*, and 162*c*. For instance, at least one of the first plate 158 and the second plate 160 can be a stamped metal plate. In addition, the at least one dividing wall 166*a*, 166*b* can be a rib extending from at least one of the first plate 158 and the second plate 160.

In addition, the first plate 158 and the second plate 160 can have side edges 168 on two or more sides, for instance three sides. The side edges 168 of the first plate 158 and the second plate 160 are projecting towards each other. The side edges 168 of the first plate 158 and the second plate 160 can be joined with each other. In addition, the adjoining side edges 168 of the first plate 158 and the second plate 160 can be crimped with each other.

Further, the return tank 180 includes a third plate 182 and a fourth plate 184 coupled to the third plate 182 to define a return chamber (not shown) with an aperture 186 to form connection between the return tank 180 and the tubular element 102. For instance, the third plate 182 and the fourth plate 184 can be coupled though the brazing process. The aperture 186 of the return tank 180 is adapted to receive and securely hold the second end/return end 103*b* of the tubular element 102. In addition, the return chamber of the return tank 180 and the inlet and outlet channels 104*a*, 104*b*, 106*a*, 106*b* of the tubular element 102 are fluidically connected through the aperture 186 such that the fluid flowing through the inlet channels 104*a*, 104*b* is collected in the return chamber and further the fluid is directed/supplied to the outlet channels 106*a*, 106*b* to follow the U-flow path in the tubular element 102. In an embodiment, cross-section of the return tank 180 can have a rectangular shape. In another embodiment, cross-section of the return tank 180 can have substantially U-shape.

In addition, each of the third plate 182 and the fourth plate 184 can have side edges 190 on two or more sides, for instance three sides. The side edges 190 of the third plate 182 and the fourth plate 184 are projecting towards each other and can be joined with each other. For instance, the adjoining side edges 190 of the third plate 182 and the fourth plate 184 can be crimped with each other.

In an embodiment, as shown in FIG. 1, the fluid distribution tank 152 can include one dividing wall 166*a* located between the first plate 158 and the second plate 160 to divide the distribution chamber into the two sub-chambers 162*a* and 162*b*. The two sub-chambers 162*a* and 162*b* extend from the connecting opening 164. For instance, cross-sections of the two sub-chambers 162*a* and 162*b* can have a rectangular shape, and the dividing wall 166*a* can be straight. In addition, the dividing wall 166*a* can be projected from at least one of the first plate 158 and the second plate 160. For instance, the dividing wall 166*a* can be projected from the first plate 158 and formed by stamping process. The dividing wall 166*a* can be coupled to the second plate 160 through a joining process, such as brazing process. In addition, the inlet opening 154*a* and the outlet opening 156*a* can be provided on the first plate 158, wherein the inlet opening 154*a* can be fluidically connected to the sub-chamber 162*a* for ingress of the fluid with respect to the sub-chamber 162*a*, and the outlet opening 156*a* can be fluidically connected to the sub-chamber 162*b* for egress of the fluid with respect to the sub-chamber 162*b*. In addition, volumes of the individual sub-chambers 162*a* and 162*b* are different from each other. For instance, the volume of the sub-chambers 162*a* can be more than the volume of the sub-chambers 162*b*.

Figure 2:
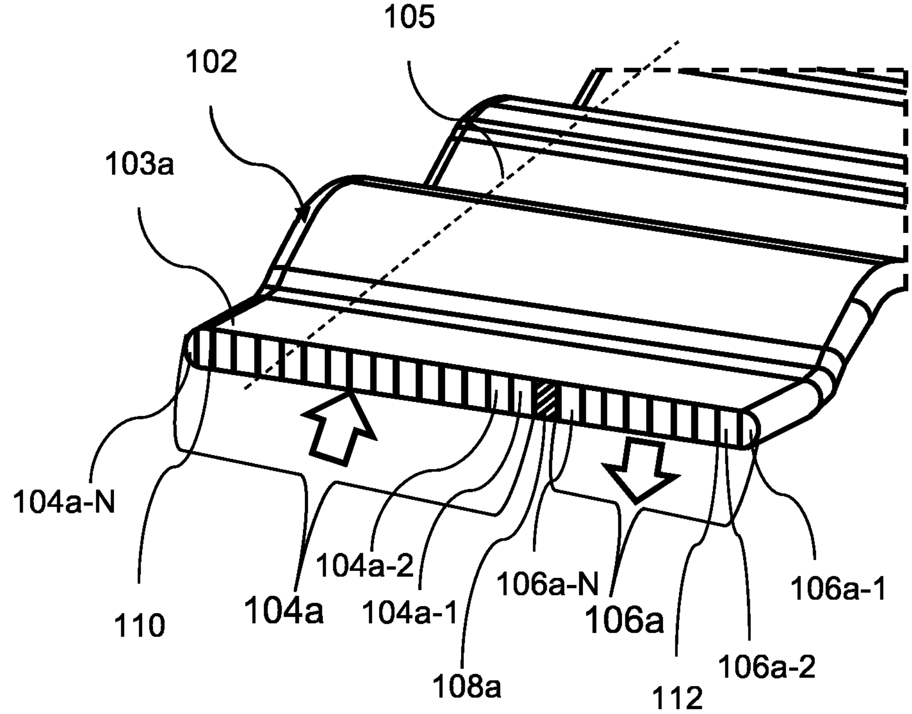
FIG. 2 illustrates a tubular element with one set of inlet channels and one set of outlet channels of the tank and tube assembly of FIG. 1.

In an embodiment, as shown in FIG. 2, the tubular element 102 can include one set of inlet channels, such as inlet channels 104*a*-1, 104*a*-2 . . . 104*a*-N (hereinafter, also collectively referred to as inlet channels 104*a*), and one set of outlet channels, such as outlet channels 106*a*-1, 106*a*-2 . . . 106*a*-N (hereinafter, collectively referred to as outlet channels 106*a*). The set of inlet channels 104*a* and the set of outlet channels 106*a* are separated by a separating wall 108*a*. The separating wall can be configured proximal to a longitudinal side wall of the tubular element 102 close to the outlet channels 106*a*. In addition, adjacent inlet channels, such as inlet channels 104*a*-1 and 104*a*-2, are arranged in series and separated from each other by a first partition wall 110. The thickness of the first partition wall 110 is less than thickness of the separating wall 108*a*. Similarly, adjacent outlet channels, such as outlet channels 106*a*-1 and 106*a*-2, are arranged in series and are separated from each other by a second partition wall 112. Thickness of the second partition wall 112 is less than thickness of the separating wall 108*a*. For instance, the thickness of the separating wall 108*a* can be greater than or equal to a gap between the adjacent first partition walls 110 or a gap between the adjacent second partition walls 112.

Further, cross-section areas of at least two individual inlet channels, such as channels 104*a*-1 and 104*a*-N within the set of inlet channels 104*a* can be different from each other. In addition, cross-section areas of at least two individual outlet channels, such as outlet channels 106*a*-1 and 106*a*-2, within the set of outlet channels 106*a* can be different from each other. Further, the cumulative cross-section area of the set of inlet channels 104*a* can be different from the cumulative cross-section area of the set of outlet channels 106*a*. Furthermore, a number of the inlet channels within the set of inlet channels 104*a* can be different from the number of the outlet channels within the set of outlet channels 106*a*. A ratio between the number of the inlet channels within the set of inlet channels 104*a* to the number of the outlet channels within the set of outlet channels 106*a* can be in a range of 1.5 to 3

Besides, the outlet channels 106*a* are configured in fluid communication with the inlet channels 104*a* at the second end 103*b* through the return tank 180 to create a U-flow pass for the fluid through the tubular element 102. The inlet channels 104*a* is fluidically connected to the sub-chambers 162*a* such that the fluid received in the sub-chambers 162*a* though the inlet opening 154*a* flows through the inlet channels 104*a* towards the return tanks 180. In addition, the outlet channels 106*a* is fluidically connected to the sub-chambers 162*b*. The sub-chamber 162*b* is configured to collect fluid from the outlet channels 106*a* and further the collected fluid in the sub-chamber 162*b* is egressed though the outlet opening 156*a*.

In addition, the tubular element 102 can be made of any suitable thermal conductive material and can be arranged such that the battery cells to be cooled can be indirectly in contact with the fluid/coolant circulating through tubular element 102 along the U-flow path. Thus, the fluid circulating through the tubular element 102 can extract heat from the battery cells and cool the battery cells. In an embodiment, the tubular element 102 can have a flat profile extending along an extension axis 105 parallel to the general direction of the inlet channels 104*a* and the outlet channels 106*a*. For instance, the flat profile can be understood a tube cross-section with parallel, wide top and bottom walls and two much shorter side walls. In addition, at least portion of the flat profile of the tubular element 102 can be waved along the extension axis. For instance, the waved profile of the tubular element 102 can be understood a tube cross-section with the top and bottom walls and two shorter side walls are shaped into alternating grooves and ridges.

Figure 3:
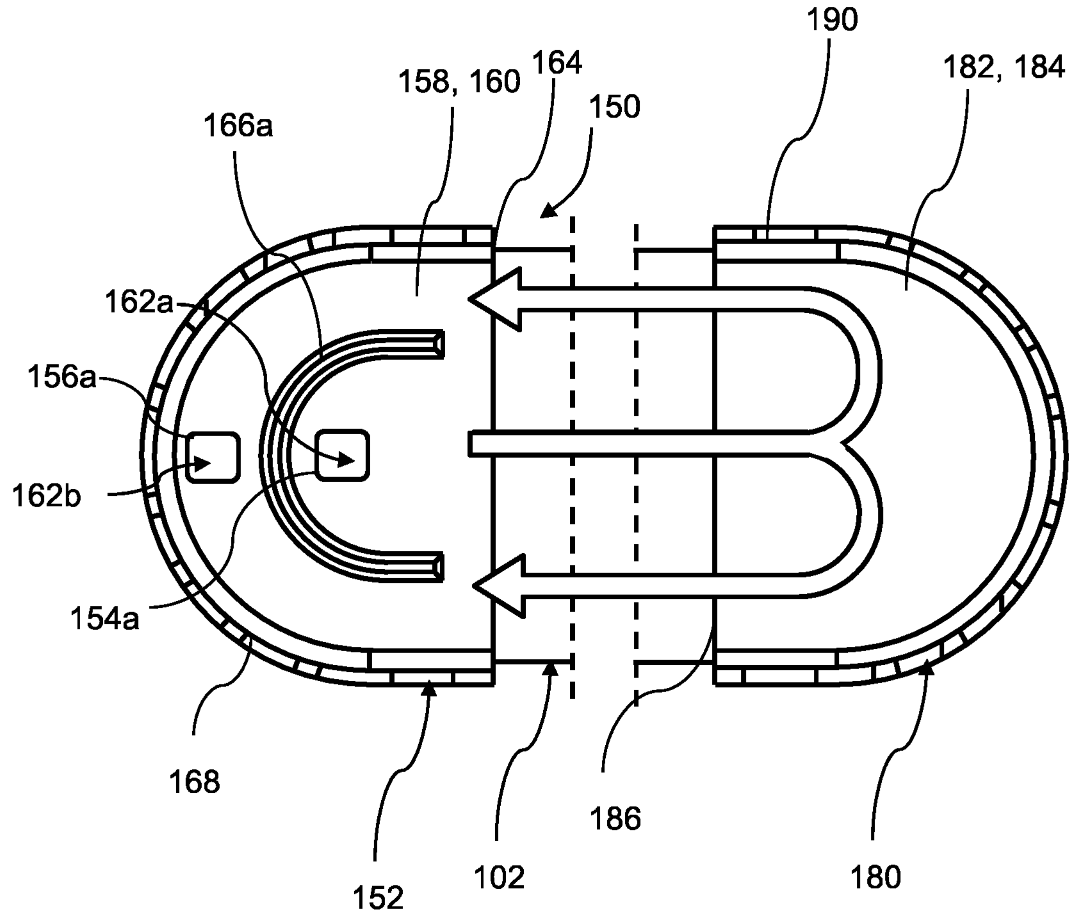
FIG. 3 illustrates a tank and tube assembly with two U-flow passes in accordance with an embodiment of the present invention.
Figure 4:
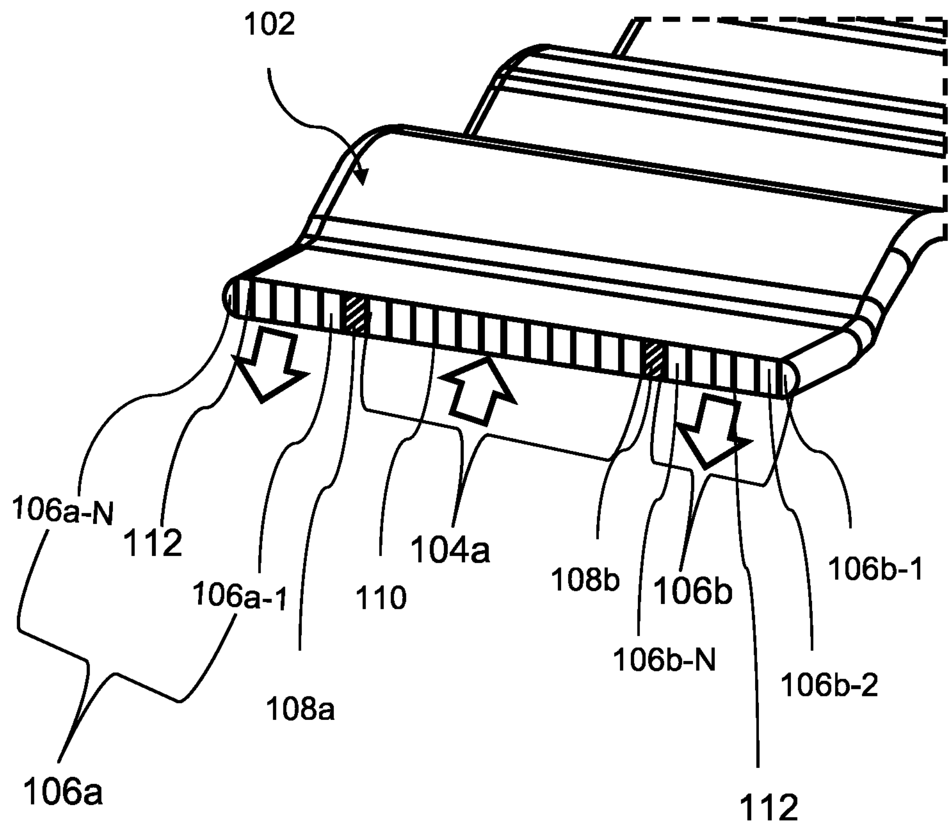
FIG. 4 illustrates a tubular element with one set of inlet channels and two sets of outlet channels of the tank and tube assembly of FIG. 3.

In another embodiment, referring to FIG. 3 and FIG. 4, the fluid distribution tank 152 can include a substantially U-shaped dividing wall 166*a* configured between first plate 158 and the second plate 160. The two sub-chambers 162*a* and 162*b* extend from the connecting opening so as to form arched pathways for the fluid from the inlet opening 154*a* and to the outlet opening 156*a*. For instance, cross-section of the two sub-chambers 162*a* and 162*b* can be substantially U-shaped. Volumes of the individual sub-chambers 162*a* and 162*b* can be different from each other. In addition, the sub-chamber 162*b* can surround the other sub-chamber 162*a*. The sub-chamber 162*a* is connected to the inlet opening 154*a* and the sub-chamber 162*b* is connected to the outlet opening 156*a*.

As shown in FIG. 4, the tubular element 102 can include two sets of outlet channels 106*a* and 106*b*, one set of inlet channels 104*a* configured between the two sets of outlet channels 106*a* and 106*b*, and two separating walls 108*a* and 108*b* configured between the two sets of outlet channels 106*a* and 106*b* and the set of inlet channels 104*a*. The set of inlet channels 104*a* are fluidically connected to the sub-chamber 162*a* which is connected to the inlet opening 154*a* for ingress of the fluid with respect to the sub-chamber 162*a* and the two sets of outlet channels 106*a* and 106*b* are fluidically connected to the sub-chamber 162*b* from two opposite sides adjacent to the sub-chamber 162*a*, thereby creating two U-flow path for the fluid in the tubular element 102. The sub-chamber 162*b* is connected to the outlet opening 156*a* for egress of the fluid with respect to the sub-chamber 162*b*. The fluid flowing through the set of inlet channels 104*a* can be directed by the return tank 180 towards the two sets of outlet channels 106*a* and 106*b* to follow double U-flow path and returns through the two sets of outlet channels 106*a* and 106*b*.

Similar to the set of outlet channels 106*a*, adjacent outlet channels, such as outlet channels 106*b*-1 and 106*b*-2, of the set of outlet channels 106*b* are arranged in series and are separated from each other in each case by the second partition wall 112. In addition, cross-section areas of at least two individual outlet channels, such as outlet channels 106*b*-1 and 106*b*-2, within the set of outlet channels 106*b* can be different from each other. Further, the cumulative cross-section area of the set of inlet channels 104*a* can be different from the cumulative cross-section area of the two sets of outlet channels 106*a* and 106*b*. Furthermore, a number of the inlet channels within the set of inlet channels 104*a* can be different from the number of the outlet channels within the sets of outlet channels 106*a* and 106*b*. For instance, the number of inlet channels 104*a* can be more than the number of outlet channels 106*a* and 106*b*, as shown in FIG. 4. A ratio between the number of the inlet channels within the set of inlet channels 104*a* to the number of the outlet channels within the sets of outlet channels 106*a* and 106*b* can be in a range of 1.5 to 3.

In addition, thickness of the first partition wall 110 and/or thickness of the second partition wall 112 can be less than thickness of the separating walls 108*a* and 108*b*. For instance, the thickness of each of the separating walls 108*a* and 108*b* can be greater than or equal to a gap between the adjacent first partition walls 110 or a gap between the adjacent second partition walls 112.

Figure 5:
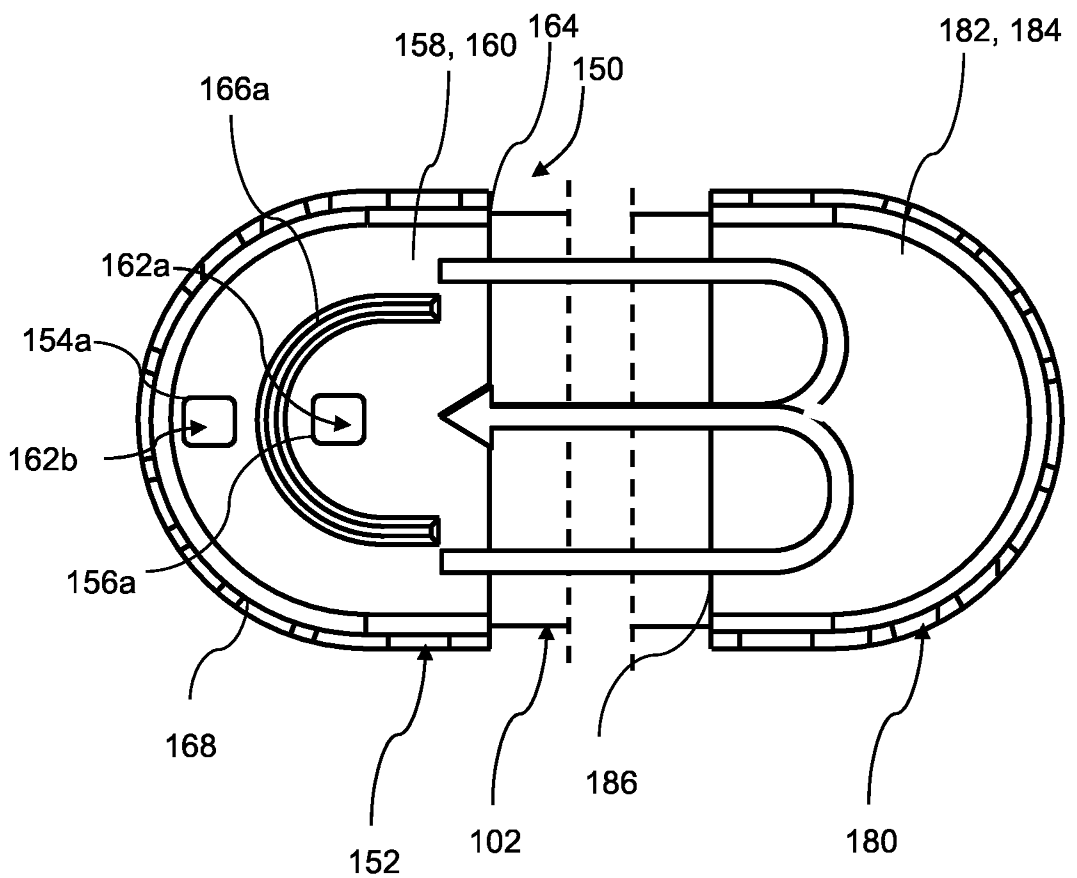
FIG. 5 illustrates a tank and tube assembly with a fluid distribution tank having one inlet opening and one outlet opening for two U-flow passes in accordance with an embodiment of the present invention.
Figure 6:
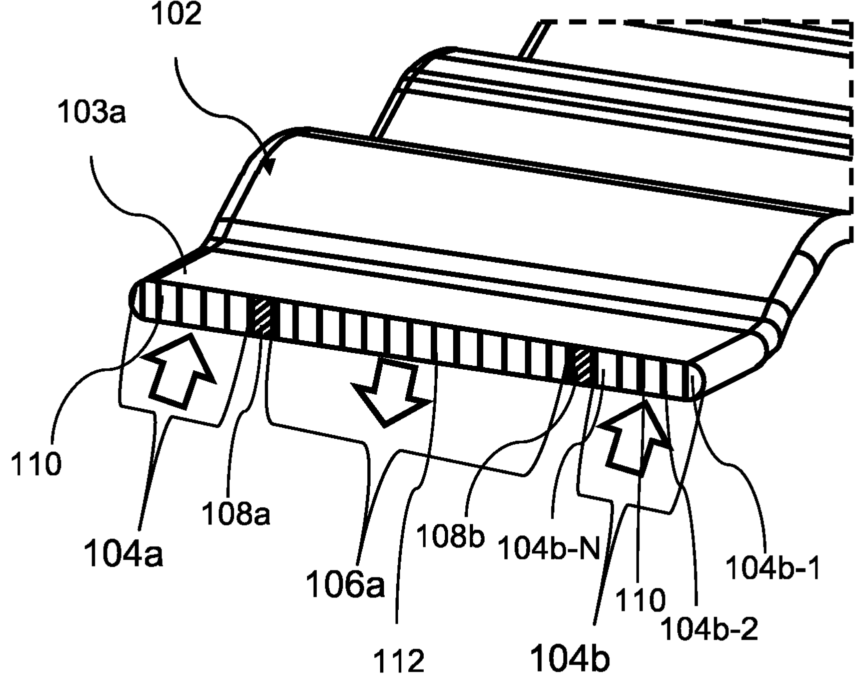
FIG. 6 illustrates a tubular element with two sets of inlet channels and one set of outlet channels of the tank and tube assembly of FIG. 5.

In an alternate embodiment, as shown in FIG. 5 and FIG. 6, the sub-chamber 162*a* can be connected to the outlet opening 156*a* and the sub-chamber 162*b* can be connected to the inlet opening 154*a*. In addition, the tubular element 102 can include two sets of inlet channels 104*a* and 104*b*, one set of outlet channels 106*a* configured between the two sets of inlet channels 104*a* and 104*b*, and two separating walls 108*a* and 108*b* configured between the two sets of inlet channels 104*a* and 104*b* and the set of outlet channels 106*a*, as shown in FIG. 6. The two sets of inlet channels 104*a* and 104*b* are fluidically connected to the sub-chamber 162*b* which is connected to the inlet opening 154*a* for egress of the fluid with respect to the sub-chamber 162*b* and the set of outlet channels 106*a* are fluidically connected to the sub-chamber 162*a* which is connected to the outlet opening 156*a* for egress of the fluid with respect to the sub-chamber 162*a*, thereby creating two U-flow path for the fluid in the tubular element 102. The fluid flowing through the two sets of inlet channels 104*a* and 104*b* can be directed by the return tank 180 towards the set of outlet channels 106*a* to returns through the set of outlet channels 106*a* and follow U-flow path.

Similar to the set of inlet channels 104*a*, adjacent inlet channels, such as inlet channels 104*b*-1 and 104*b*-2, of the set of inlet channels 104*b* are arranged in series and are separated from each other in each case by the first partition wall 110. In addition, cross-section areas of at least two individual inlet channels, such as inlet channels 104*b*-1 and 104*b*-2, within the set of inlet channels 104*b* can be different from each other. Further, the cumulative cross-section area of the sets of inlet channels 104*a* and 104*b* can be different from the cumulative cross-section area of the set of outlet channels 106*a*. Furthermore, a number of the inlet channels within the sets of inlet channels 104*a* and 104*b* can be different from the number of the outlet channels within the set of outlet channels 106*a*. For instance, the number of inlet channels 104*a* and 104*b* can be less than the number of outlet channels 106*a*, as shown in FIG. 6. A ratio between the number of the outlet channels within the set of outlet channels 106*a* to the number of the inlet channels within the sets of inlet channels 104*a* and 104*b* can be in a range of 1.5 to 3

Figure 7:
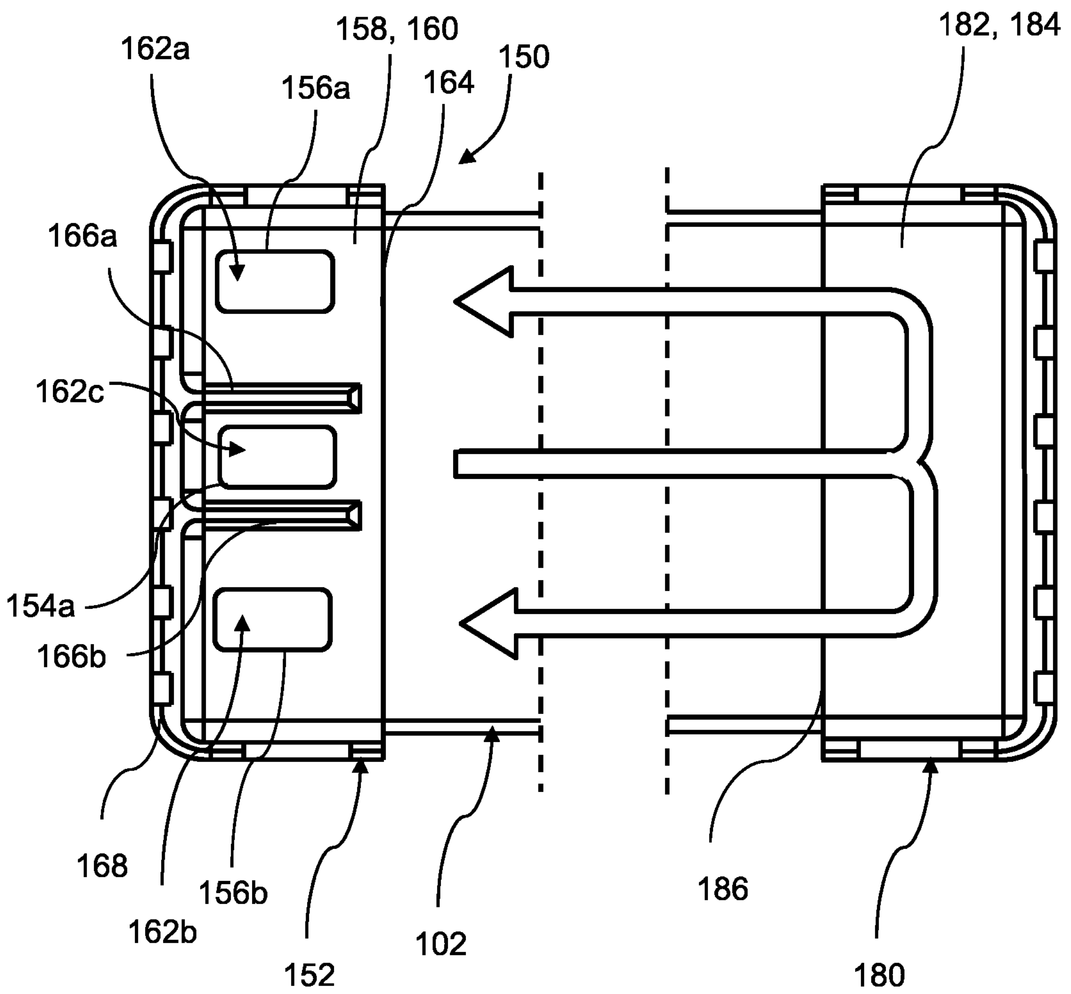
FIG. 7 illustrates a tank and tube assembly with a fluid distribution tank having one inlet opening and two outlet openings in accordance with an embodiment of the present invention.
Figure 8:
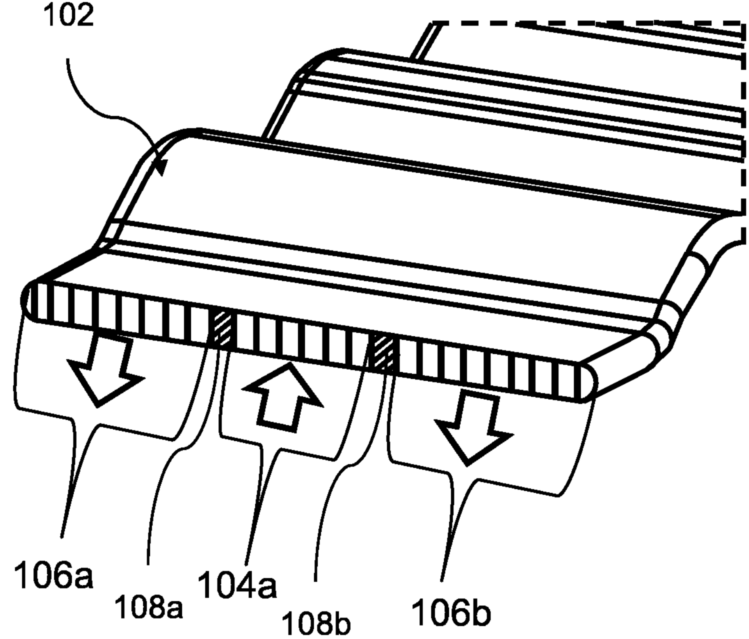
FIG. 8 illustrates a tubular element with one set of inlet channels and two sets of outlet channels of the tank and tube assembly of FIG. 7.

In another embodiment, referring to FIG. 7 and FIG. 8, the fluid distribution tank 152 can include two straight dividing walls 166*a* and 166*b* between first plate 158 and the second plate 160 to divide the distribution chamber into three sub-chambers 162*a*, 162*b* and 162*c*. The three sub-chambers 162*a*, 162*b* and 162*c* extend from the connecting opening 164. For instance, cross-sections of the three sub-chambers 162*a*, 162*b* and 162*c* can have a rectangular shape. In addition, the dividing walls 166*a* and 166*b* can be projected from at least one of the first plate 158 and the second plate 160. For instance, the dividing walls 166*a* and 166*b* can be rib formed by stamping the first plate 158. The dividing walls 166*a* and 166*b* can be coupled to the second plate 160 through the brazing process. In addition, the fluid distribution tank 152 can include one inlet opening 154*a* and two outlet openings 156*a* and 156*b*, which can be provided on the first plate 158. The inlet opening 154*a* can be fluidically connected to the sub-chamber 162*c* for ingress of the fluid with respect to the sub-chamber 162*c*, and the outlet openings 156*a* and 156*b* can be fluidically connected to the sub-chamber 162*a* and 162*b* for egress of the fluid with respect to the sub-chamber 162*a* and 162*b*. In addition, volumes of the individual sub-chambers 162*a*, 162*b* and 162*c* can be different from each other. For instance, the volume of the sub-chambers 162*a* and 162*b* can be more than the volume of the sub-chambers 162*c*.

As shown in FIG. 8, the tubular element 102 can include two sets of outlet channels 106*a* and 106*b*, one set of inlet channels 104*a* configured between the two sets of outlet channels 106*a* and 106*b*, and two separating walls 108*a* and 108*b* configured between the two sets of outlet channels 106*a* and 106*b* and the set of inlet channels 104*a*. The set of inlet channels 104*a* are fluidically connected to the sub-chamber 162*c* which is connected to the inlet opening 154*a* for ingress of the fluid with respect to the sub-chamber 162*c*, whereas the two sets of outlet channels 106*a* and 106*b* are fluidically connected to the sub-chambers 162*a* and 162*b* respectively, which are connected to the outlet openings 156*a* and 156*b* for egress of the fluid with respect to the sub-chambers 162*a* and 162*b*, thereby creating two U-flow path for the fluid in the tubular element 102.

For instance, the cumulative cross-section area of the set of inlet channels 104*a* can be different from the cumulative cross-section area of the two sets of outlet channels 106*a* and 106*b*. Furthermore, a number of the inlet channels within the set of inlet channels 104*a* can be different from the number of the outlet channels within the sets of outlet channels 106*a* and 106*b*. For instance, the number of inlet channels 104*a* can be less than the number of outlet channels 106*a* and 106*b*, as shown in FIG. 8. A ratio between the number of the outlet channels within the sets of outlet channels 106*a* and 106*b* to the number of the inlet channels within the set of inlet channels 104*a* can be in a range of 1.5 to 3.

Figure 10:
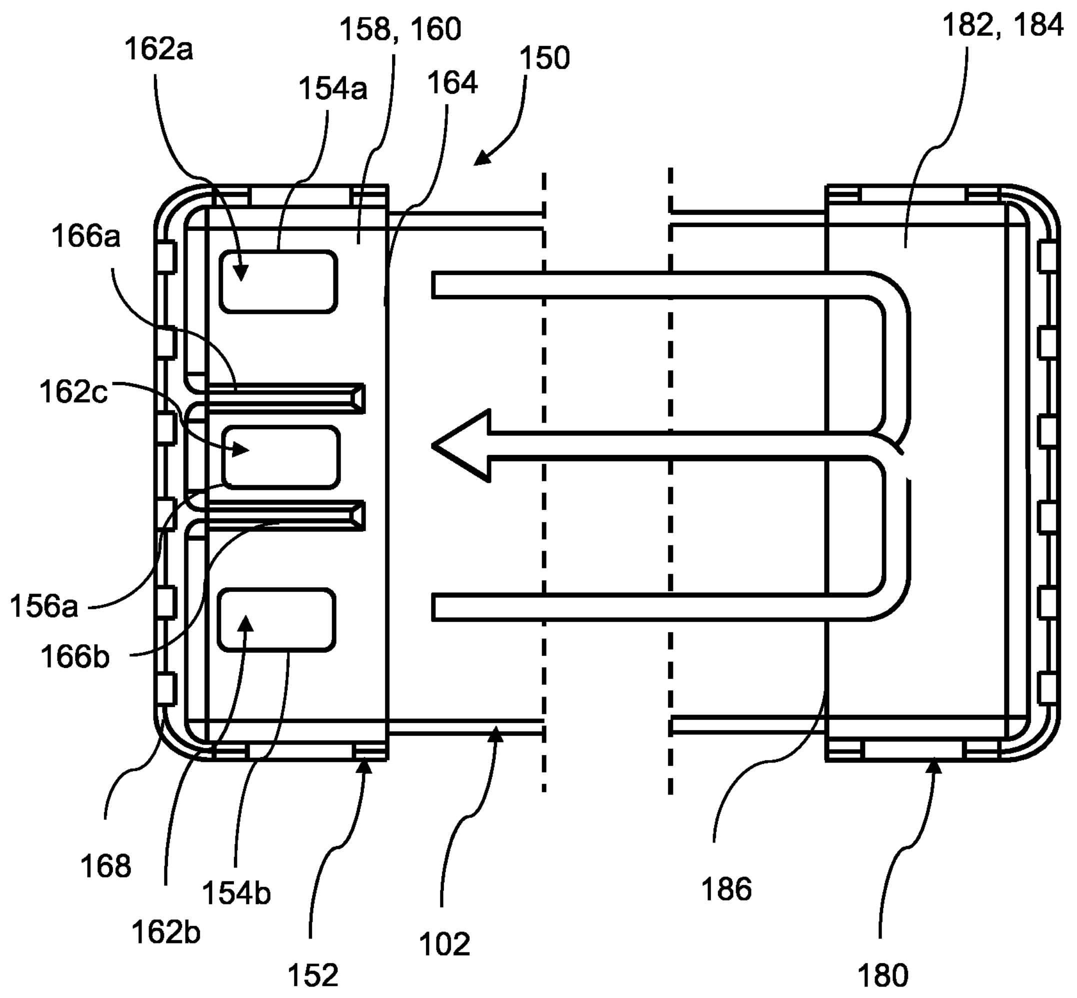
FIG. 10 illustrates a tank and tube assembly with a fluid distribution tank having two inlet openings and one outlet opening in accordance with an embodiment of the present invention.
Figure 11:
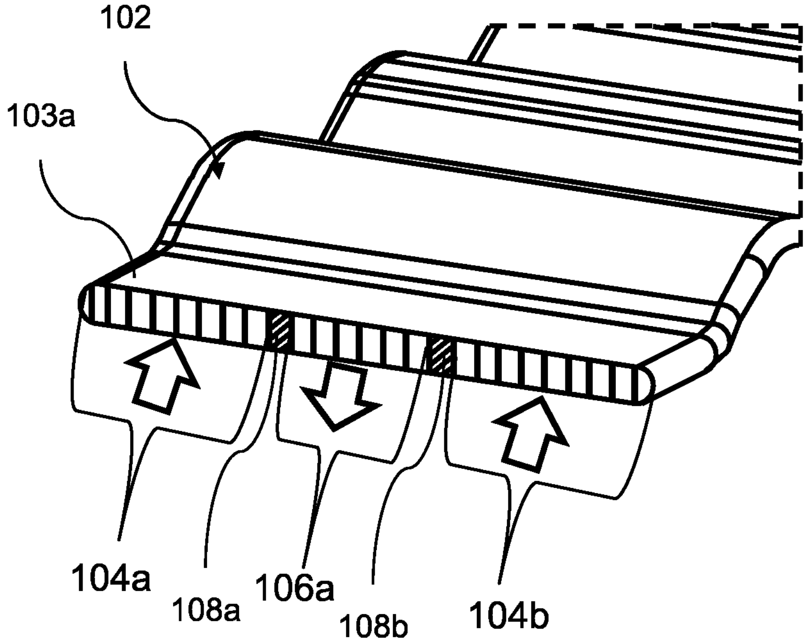
FIG. 11 illustrates a tubular element with two sets of inlet channels and one set of outlet channels of the tank and tube assembly of FIG. 10.

In an alternate embodiment, referring to FIG. 10 and FIG. 11, the fluid distribution tank 152 can include two inlet openings 154*a* and 154*b* and one outlet opening 156*a*, which can be provided on at least one of the first plate 158 and the second plate 160. The inlet openings 154*a* and 154*b* can be fluidically connected to the sub-chamber 162*a* and 162*b* for ingress of the fluid with respect to the sub-chamber 162*a* and 162*b* respectively and the outlet opening 156*a* can be fluidically connected to the sub-chamber 162*c* for egress of the fluid with respect to the sub-chamber 162*c*.

In addition, the tubular element 102 can include two sets of inlet channels 104*a* and 104*b*, one set of outlet channels 106*a* configured between the two sets of inlet channels 104*a* and 104*b*, and two separating walls 108*a* and 108*b* configured between the two sets of inlet channels 104*a* and 104*b* and the set of outlet channels 106*a*, as shown in FIG. 11. The two sets of inlet channels 104*a* and 104*b* are fluidically connected to the sub-chambers 162*a* and 162*b*, respectively, which are connected to the inlet openings 154*a* and 154*b* for ingress of the fluid with respect to the sub-chamber 162*a* and 162*b*. The set of outlet channels 106*a* are fluidically connected to the sub-chamber 162*c* which is connected to the outlet opening 156*a* for egress of the fluid with respect to the sub-chamber 162*c*, thereby creating two U-flow path for the fluid in the tubular element 102. The fluid flowing through the two sets of inlet channels 104*a* and 104*b* can be directed by the return tank 180 towards the set of outlet channels 106*a* to returns through the set of outlet channels 106*a* and follow U-flow path.

Further, the cumulative cross-section area of the sets of inlet channels 104*a* and 104*b* can be different from the cumulative cross-section area of the set of outlet channels 106*a*. Furthermore, a number of the inlet channels within the sets of inlet channels 104*a* and 104*b* can be different from the number of the outlet channels within the set of outlet channels 106*a*. For instance, the number of inlet channels 104*a* and 104*b* can be more than the number of outlet channels 106*a*, as shown in FIG. 11. A ratio between the number of the inlet channels within the sets of inlet channels 104*a* and 104*b* to the number of the outlet channels within the set of outlet channels 106*a* can be in a range of 1.5 to 3.

Figure 9:
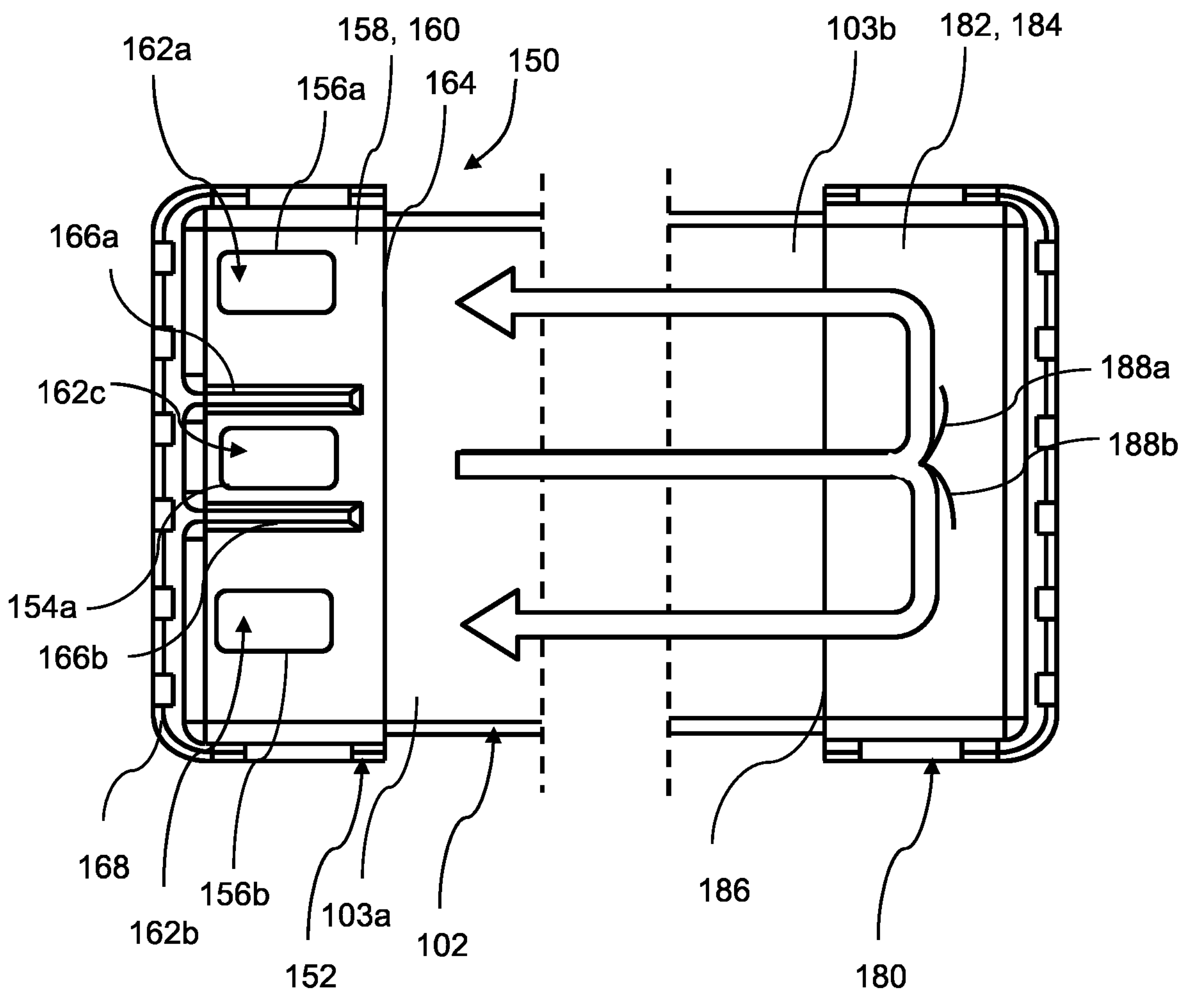
FIG. 9 illustrates a tank and tube assembly with a return tank having fluid guiding walls in accordance with an embodiment of the present invention.

In an embodiment, as shown in FIG. 9, the return tank 180 can include one or more fluid guiding walls 188*a* and 188*b* projected in the return chamber. The fluid guiding walls 188*a* and 188*b* can be adapted to direct the fluid egressing the set of inlet channels 104*a* towards the sets of outlet channels 106*a* and 106*b*. The fluid guiding walls 188*a* and 188*b* can be curved projections projecting from at least of the third plate 182 and the fourth plate 184.

In any case, the invention cannot and should not be limited to the embodiments specifically described in this document, as other embodiments might exist. The invention shall spread to any equivalent means and any technically operating combination of means.

What is claimed is:

1. A fluid distribution tank for a tubular element of a heat exchanger, the fluid distribution tank comprising:

a pair of plates, including a first plate and a second plate, coupled with each other to define a distribution chamber with a connecting opening between the first plate and the second plate, the connecting opening being adapted to form connection between the fluid distribution tank and the tubular element; and at least one U-shaped dividing wall located between the first plate and the second plate to divide the distribution chamber into at least two sub-chambers extending from the connecting opening, the at least one U-shaped dividing wall projecting from the first plate and the second plate, wherein volumes of the individual sub-chambers are different from each other.

2. The fluid distribution tank as claimed in claim 1, wherein at least one of the first plate and the second plate includes at least one inlet opening for ingress of the fluid with respect to the distribution chamber, and at least one of the first plate and the second plate includes at least one outlet opening for egress of the fluid with respect to the distribution chamber.

3. The fluid distribution tank as claimed in claim 2, wherein at least one of the at least two sub-chambers are fluidically connected to the at least one outlet opening.

4. The fluid distribution tank as claimed in claim 2, wherein at least one of the at least two sub-chambers is fluidically connected to the at least one inlet opening.

5. The fluid distribution tank as claimed in claim 1, wherein the first plate and the second plate have side edges projecting towards each other, and wherein the side edges of the first plate adjoin with the side edges of the second plate.

6. The fluid distribution tank as claimed in claim 5, wherein the adjoining side edges of the first plate and the second plate are crimped with each other.

7. The fluid distribution tank as claimed in claim 1, wherein at least one of the first plate and the second plate is a stamped metal plate.

8. The fluid distribution tank as claimed in claim 1, wherein the cross-sections of the at least two sub-chambers have a rectangular shape.

9. The fluid distribution tank as claimed in claim 2, wherein the at least two sub-chambers extend from the connecting opening so as to form arched pathways for the fluid from the at least one inlet and to the at least one outlet.

10. The fluid distribution tank as claimed in claim 9, wherein the at least one U-shaped dividing wall projects orthogonally from the first plate and the second plate.

11. A tank and tube assembly for a heat exchanger, the tank and tube assembly comprising: a tubular element including at least one set of inlet channels and at least one set of outlet channels configured in fluid communication with the at least one set of inlet channels to create at least one U-flow pass for a fluid through the tubular element; and a fluid distribution tank coupled to a first end of the tubular element;

wherein the fluid distribution tank includes:

a pair of plates, including a first plate and a second plate, coupled with each other to define a distribution chamber with a connecting opening between the first plate and the second plate, the connecting opening being adapted to form connection between the fluid distribution tank and the tubular element; and at least one U-shaped dividing wall located between the first plate and the second plate to divide the distribution chamber into the at least two sub-chambers extending from the connecting opening, the at least one U-shaped dividing wall projecting from the first plate and the second plate, wherein volumes of the individual sub-chambers are different from each other.

12. The tank and tube assembly as claimed in claim 11, wherein at least one of the first plate and the second plate includes at least one inlet opening for ingress of the fluid with respect to the distribution chamber, and at least one of the first plate and the second plate includes at least one outlet opening for egress of the fluid with respect to the distribution chamber.

13. The tank and tube assembly as claimed in claim 11, wherein the cross-sections of the at least two sub-chambers have a rectangular shape.

14. The tank and tube assembly as claimed in claim 11, wherein the at least one U-shaped dividing wall projects orthogonally from the first plate and the second plate.

15. The tank and tube assembly as claimed in claim 11, further including an inlet opening and an outlet opening provided on the first plate, the inlet opening fluidically connected to an individual sub-chamber and the outlet opening fluidically connected to another individual sub-chamber.

16. A fluid distribution tank for a tubular element of a heat exchanger, the fluid distribution tank comprising:

a pair of plates, including a first plate and a second plate, coupled with each other to define a distribution chamber with a connecting opening between the first plate and the second plate, the connecting opening being adapted to form connection between the fluid distribution tank and the tubular element; and at least one dividing wall located between the first plate and the second plate to divide the distribution chamber into at least two sub-chambers extending from the connecting opening, the at least one dividing wall projecting orthogonally from the first plate and the second plate.

17. The fluid distribution tank as claimed in claim 16, wherein volumes of the individual sub-chambers are different from each other.

18. The fluid distribution tank as claimed in claim 17, further including an inlet opening and an outlet opening provided on the first plate, the inlet opening fluidically connected to an individual sub-chamber and the outlet opening fluidically connected to another individual sub-chamber.

19. The fluid distribution tank as claimed in claim 18, wherein the at least one dividing wall is substantially U-shaped.

20. The fluid distribution tank as claimed in claim 1, further including an inlet opening and an outlet opening provided on the first plate, the inlet opening fluidically connected to an individual sub-chamber and the outlet opening fluidically connected to another individual sub-chamber.

* * * * *